(12) United States Patent
Schoinianakis

(10) Patent No.: US 12,468,904 B2
(45) Date of Patent: Nov. 11, 2025

(54) ACCELERATOR FOR MATHEMATICAL OPERATIONS BASED ON ANALOG COMPUTING

(71) Applicant: Nokia Technologies Oy, Espoo (FI)

(72) Inventor: Dimitrios Schoinianakis, Athens (GR)

(73) Assignee: Nokia Technologies Oy, Espoo (FI)

( * ) Notice: Subject to any disclaimer, the term of this patent is extended or adjusted under 35 U.S.C. 154(b) by 28 days.

(21) Appl. No.: 18/645,233

(22) Filed: Apr. 24, 2024

(65) Prior Publication Data
US 2024/0370673 A1   Nov. 7, 2024

(30) Foreign Application Priority Data

May 2, 2023 (EP) .................................... 23171077

(51) Int. Cl.
*G06G 7/04* (2006.01)
*G06G 7/16* (2006.01)

(52) U.S. Cl.
CPC ................ *G06G 7/04* (2013.01); *G06G 7/16* (2013.01)

(58) Field of Classification Search
CPC .................................. G06G 7/04; G06G 7/16
USPC .......................................................... 327/124
See application file for complete search history.

(56) References Cited

U.S. PATENT DOCUMENTS 11,153,104 B2   10/2021  Fetterolf et al.
2021/0150328 A1   5/2021  Dasalukunte et al.

2021/0173893 A1*  6/2021  Luo .................... G11C 13/0069
2022/0229634 A1   7/2022  Hein et al.
2023/0074229 A1*  3/2023  Jia ........................ G06F 15/7821

OTHER PUBLICATIONS

AI's immense potential is being constrained, Mythic, Retrieved on Apr. 25, 2024, Webpage available at : https://mythic.ai/.
Solyanik et al., "High-speed secure optical hashing for transformational computing (Conference Presentation)"; Proceedings vol. PC12225, Optics and Photonics for Information Processing XVI, Oct. 3, 2022, 3 pages.
Abozaid et al., "A Scalable Multiplier for Arbitrary Large Numbers Supporting Homomorphic Encryption", Proceedings—16th Euromicro Conference on Digital System Design, Sep. 4, 2013, 7 pages.

(Continued)

*Primary Examiner* — Tomi Skibinski
(74) *Attorney, Agent, or Firm* — Nokia Technologies Oy

(57) ABSTRACT

A computing device comprising input device terminals (x0-x4) for receiving respective analog input signals of the device; output device terminals (p0-p7) for receiving respective analog output signals of the device; rows of analog cells (C00-C01), wherein an analog cell (C00) comprises an input cell terminal and an output cell terminal, wherein an analog cell is configured to generate at the output cell terminal an output analog signal whose amplitude is the product of a multiplication coefficient by the amplitude of the input analog signal received at the input cell terminal, wherein all input terminals of the cells in a row are connected to a same input device terminal (x0-x4); a network of switches (00-33) for selectively interconnecting the output cell terminals of the analog cells and selectively connecting the output cell terminal of each of the analog cells to an output device terminal (p0-p7).

17 Claims, 9 Drawing Sheets

(56) References Cited

OTHER PUBLICATIONS

Xie et al., "Special Session: The Recent Advance in Hardware Implementation of Post-Quantum Cryptography", VLSI Test Symposium (VTS), Apr. 5-8, 2020, pp. 1-10.
Extended European Search Report received for corresponding European Patent Application No. 23171077.3, dated Oct. 16, 2023, 5 pages.

* cited by examiner

ACCELERATOR FOR MATHEMATICAL OPERATIONS BASED ON ANALOG COMPUTING

TECHNICAL FIELD

Various example embodiments relate generally to a device for performing mathematical operations (e.g. cryptographic operations) using analog computing.

BACKGROUND

Analog computing is a design technology, utilized for example in the fields of AI (Artificial Intelligence) and Neural Networks. (see for example Mythic AI). Analog computing can be used to accelerate heavyweight operations.

Analog computing devices may include cryptographic primitives like post-quantum cryptography and homomorphic encryption. These cryptographic primitives are characterized by their immense complexity, large keys, and tedious cryptographic operations—mainly Multiply-Accumulate (MAC) operations on very large operands. An illustrative example comes from homomorphic encryption which requires gigabytes of keys.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a computation device comprises: one or more input device terminals for receiving respective analog input signals of the device; one or more output device terminals for receiving respective analog output signals of the device; one or more rows of analog cells, wherein an analog cell comprises an input cell terminal and an output cell terminal, wherein an analog cell is configured to generate at the output cell terminal an output analog signal whose amplitude is the product of a multiplication coefficient by the amplitude of the input analog signal received at the input cell terminal, wherein all input terminals of the cells in a row are connected to a same input device terminal; a network of switches for selectively interconnecting the output cell terminals of the analog cells and selectively connecting the output cell terminal of each of the analog cells to an output device terminal.

Each switch in the network of switches may comprises four terminals.

The multiplication coefficient may correspond to a conductance value or resistance value.

For each switch in the network, a first terminal of the switch may be connected to the output cell terminal of a cell associated with the switch.

For at least one switch, a second terminal of the switch may be connected to the first terminal of another switch or to an output device terminal.

For at least one switch, a third terminal of the switch may be connected to the fourth terminal of another switch or to an output device terminal.

For at least one switch is configured to receive a control signal for activating a switch terminal interconnection configuration of the fourth terminals of the switch.

At least one cell may be configured to receive a configuration signal for configuring the multiplication coefficient.

In one or more embodiments, according to at least one first switch terminal interconnection configuration, two first terminals of the four terminals are connected to each other and the two remaining terminals are connected to each other but not connected to the two first terminals.

In one or more embodiments, according to at least one second switch terminal interconnection configuration, two first terminals of the four terminals are connected to each other and none of the two remaining terminals are not connected to another terminal.

In one or more embodiments, according to at least one third switch terminal interconnection configuration, three of the four terminals are connected to each other and the last remaining terminal is not connected to the other terminals.

The computation device may include: one or more Digital to Analog Converters connected respectively to the one or more input device terminals and configured to generate the respective analog input signals respectively from respective digital input signals;

The computation device may include: one or more Analog to Digital Converters connected respectively to the one or more output device terminals and configured to generate respective digital output signals from the respective analog output signals of the device.

According to a second aspect, an apparatus comprises a computation device according to the first aspect; a switch fabric controller configured to generate controls signals for configuring one or more switches of the network of switches with a respective switch terminal interconnection configuration.

The apparatus may comprise: a switch fabric compiler configured to convert a mathematical function into control values identifying for one or more switches of the network of switches a respective switch terminal interconnection configuration.

The switch fabric controller may be configured to generate the controls signals based on the control values.

BRIEF DESCRIPTION OF THE DRAWINGS

Example embodiments will become more fully understood from the detailed description given herein below and the accompanying drawings, which are given by way of illustration only and thus are not limiting of this disclosure.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

A device providing analog computing functionality is disclosed. The device may be used to accelerate cryptographic operations or primitives. The device provides an analog hardware accelerator that could be embedded in future Systems on Chips (SoC), Trusted Platform Modules (TPMs), Hardware Secure Modules (HSM), or as a stand-alone accelerator.

The device is based on a modular and scalable architecture including analog elements that are able to accelerate many heavyweight cryptographic MAC (Multiply Accumulate) operations. The device can be configured to implement MAC operations on large operands as required by cryptography use case. A method to flexibly map various cryptographic algorithms to the proposed design of a computation and as such to support other operations as well is also disclosed.

Analog computing can be used to accelerate heavyweight operations. The core idea behind analog computing can be summarized by FIG. 1.

In principle, analog computing is based on in-memory computations, thus removing the delays associated with moving data from the processing units to the memory and vice versa. This memory concept is based on two fundamental axioms:

(a) Analog electric current response (output current ($I_{out}$)) from a transistor is based on its threshold voltage (Vt) and the input voltage ($V_{in}$); and (b) Kirchhoff's current law, which states that the algebraic sum of currents in a network of conductors meeting at a connection point is zero.

Figure 1:
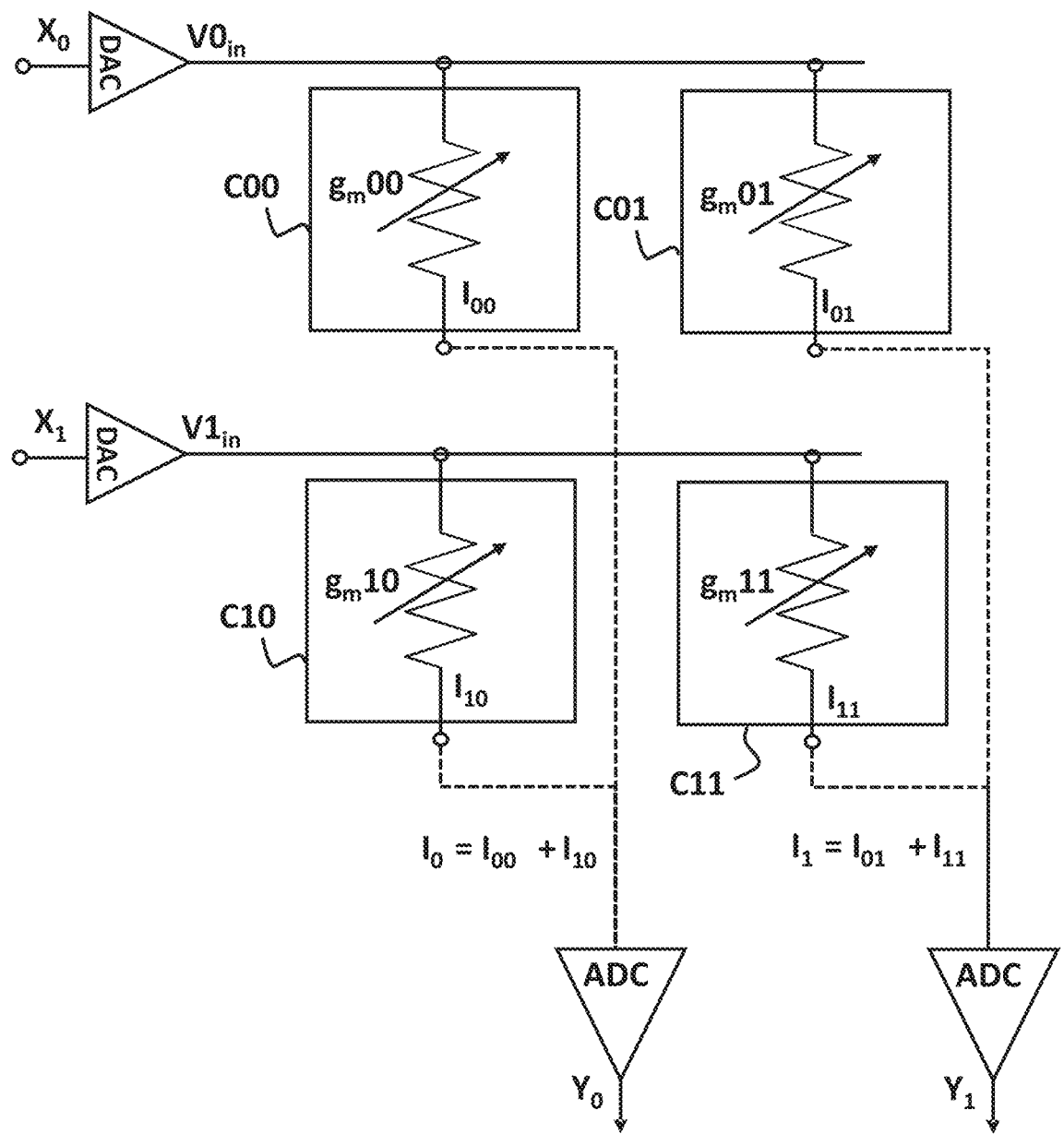
FIG. 1 shows a computation device according to an example.

FIG. 1 shows a computation device including a network of four interconnected cells C00, C01, C10, C11. The device also includes input Digital-to-Analog (DAC) converters to convert each of the digital input values $X_0$, $X_1$ to a respective analog input voltage $V0_{in}$, $V1_{in}$ and output Analog-to-Digital (ADC) converters to convert each analog output current I0, I1 back to a digital output value $Y_0$, $Y_1$. Cells C00 and C01 receives a same input voltage $V0_{in}$. Cells C10 and C11 receives a same input voltage $V1_{in}$.

Each cell C00, C01, C10, C11 in FIG. 1 may be modeled as variable resistor (conductance) (gm). When a cell is implemented using a transistor, the conductance of the cell depends on the floating gate voltage Vt of the programmed cell. A parameter used in cryptographic operations can be programmed by a corresponding floating gate voltage Vt of the memory cell, such that the conductance gm of the cell represents the parameter's value.

When an input voltage ($V_{in}$) is applied on the cell, the output current ($I_{out}$) is given by the equation $I_{out}=gm*V_{in}$, which is the multiply operation between the input voltage and the value gm configured for the cell. This multiplication is performed instantaneously. For example, the cell C00 generates an output current I00 through the conductance $g_m00$ such that $I_{00}=g_m00*V0_{in}$. The same principle applies to the other cells C01, C10, C11 that generates respective output currents I01, I10, I11

The accumulate operation is also executed instantly due to Kirchoff's law, since the output currents of the cells are connected to the same point and hence the final output is equivalent to their sum. Here the network produces two analog output currents I0, I1 converted to two digital output values Y0 and Y1.

For example, in FIG. 1:
the output current from cell C00 is I00;
the output current from cell C10 is I10;
the first output current is I0=I00+I10 that is fed to the ADC generating the digital output value $Y_0$.
Likewise, in FIG. 1:
the output current from cell C01 is I01;
the output current from cell C11 is I11;
a second output current is I1=I01+I11 that is fed to the ADC generating the digital output value Y1.

Figure 2A:
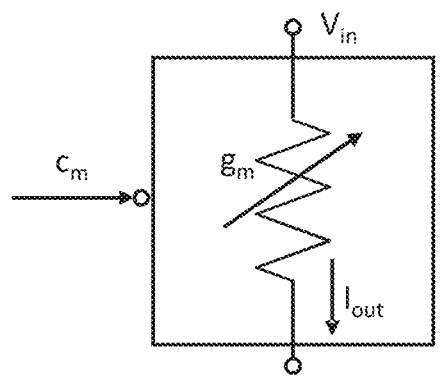
FIGS. 2A to 2C show various possible embodiments of a cell in a computation device according to examples.
Figure 2B:
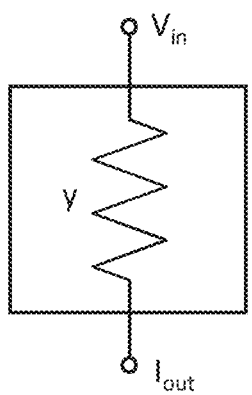
Figure 2C:
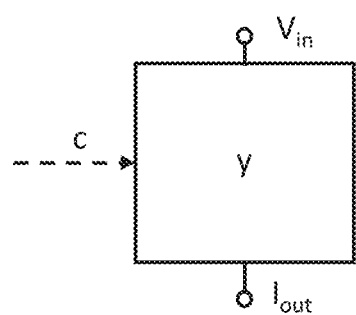

FIGS. 2A to 2C show various possible embodiments of a cell having as input a voltage and as output a current with a multiplication coefficient corresponding to a conductance value. A cell may be implemented using a programmable resistor as represented by FIG. 2A such that the output current ($I_{out}$) is given by $I_{out}=gm*V_{in}$. A cell may also be implemented using a non-variable resistor as representer by FIG. 2B. A cell may be implemented by any other (programmable or non-programmable) electrical component for which the output $I_{out}=y*V_{in}$ as representer by FIG. 2B.

Other possible embodiments of a cell may be considered in which a cell receives as input a current $I_{in}$ and produces as output a voltage $V_{out}=z*I_{in}$ with a multiplication coefficient corresponding to a resistance value z.

One of the key limitations of the type of device of FIG. 1, is that it can support very small precisions (typically 8-bits). This is not sufficient for cryptographic application.

Figure 3:
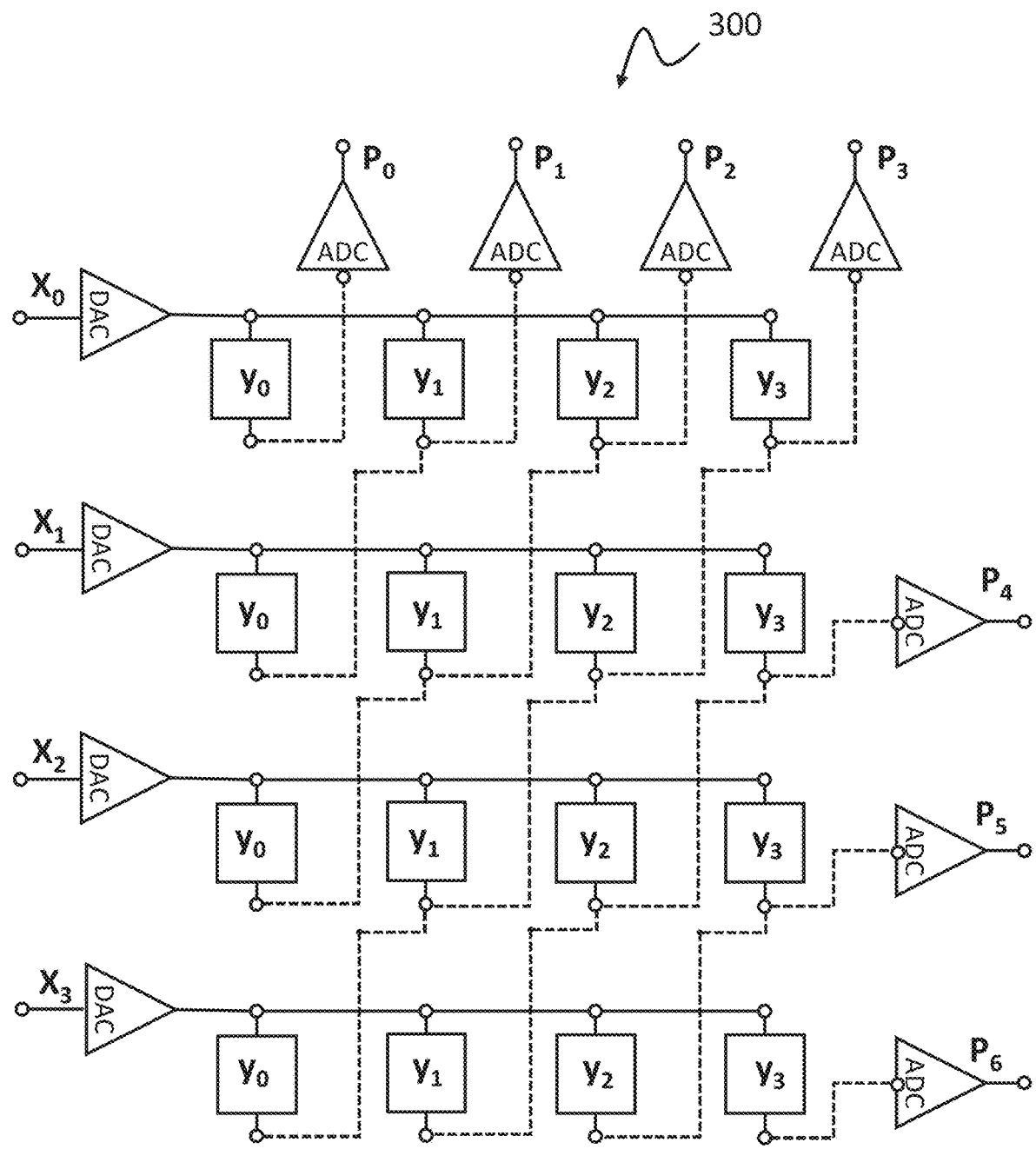
FIG. 3 shows a computation device according to an example.

FIG. 3 depicts a device configured to multiply two large operands X*y (for example, each operand having 32-bits) split in 8-bits blocks (X=X3X2X1X0, y=y3y2y1y0). As per the design principle disclosed for FIG. 1, the operand y can be programmed as the conductance of a correspond cell and the input X is applied as input to the cell network. Due to the way the cells are connected, the outputs Pi correspond to the partial products of the multiplication of X*y as per the usual school method like so:

|   |      |      |      |      | X3   | X2   | X1   | X0   |
|---|------|------|------|------|------|------|------|------|
| x |      |      |      |      | y3   | y2   | y1   | y0   |
|   |      |      |      |      | X3y0 | X2y0 | X1y0 | X0y0 |
|   |      |      |      | X3y1 | X2y1 | X1y1 | X0y1 |      |
|   |      |      | X3y2 | X2y2 | X1y2 | X0y2 |      |      |
| + |      | X3y3 | X2y3 | X1y3 | X0y3 |      |      |      |
|   |      | P6   | P5   | P4   | P3   | P2   | P1   | P0   |

Figure 4:
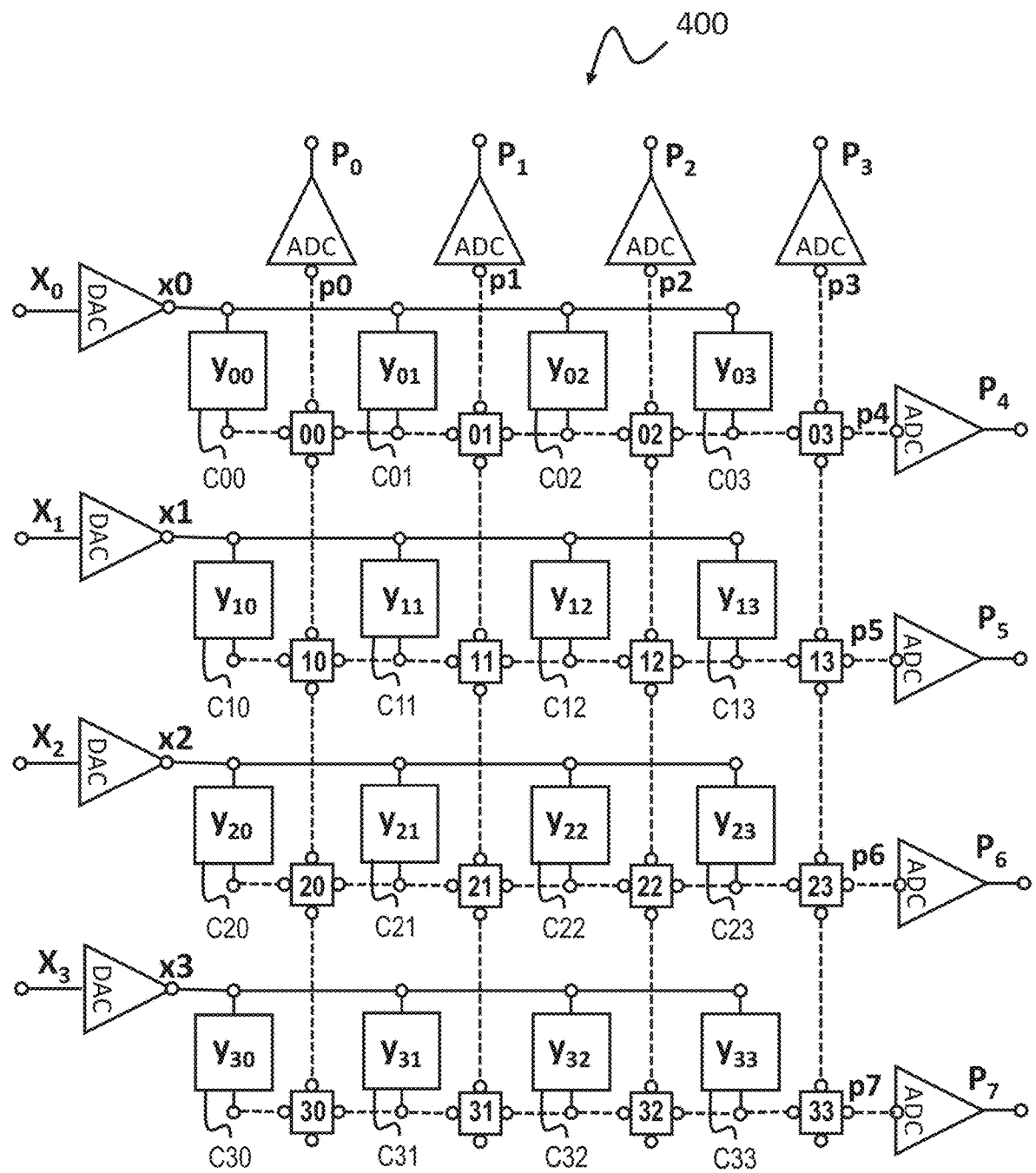
FIG. 4 shows a computation device according to an example.

FIG. 4 shows an example computation device 400 with 32-bits operands.

The device includes input device terminals (x0-x4) for receiving respective analog input signals and output device terminals (p0-p7) for receiving respective analog output signals.

A Digital to Analog Converter (DAC) is connected respectively to each input device terminal and configured to generate a respective analog input signal x0, x1, x2, x3 from a respective (here 8 bits) digital input signal $X_0$, $X_1$, $X_2$, $X_3$.

An Analog to Digital Converter (ADC) is connected respectively to each output device terminal and configured to generate a respective digital output signal $P_0$ to $P_7$ from a respective analog output signal p0 to p7 of the device.

The device includes here four rows of analog cells. Each analog cell is implemented by analog circuitry. Each analog cell comprises an input cell terminal and an output cell terminal. Each analog cell is configured to generate at the output cell terminal an output analog signal whose amplitude is the product of a multiplication coefficient (e.g. a conductance value or resistance value) by the amplitude of the input analog signal received at the input cell terminal. For example in FIG. 4, the cells C00, C01, C02, C03 of the first raw of cells have respective multiplication coefficients $y_{00}$, $y_{01}$, $y_{02}$, $y_{03}$.

All input terminals of the cells in a row are connected to a same input device terminal. This type of connection is represented with plain lines in the FIG. 4. For example, each of the cells of the first raw of cells C00, C01, C02, C03 is connected to input device terminal x0. Likewise each of the cells of the second raw of cells C10, C21, C22, C23 is connected to input device terminal x1, etc.

The computation device 400 includes a network of interconnected switches (instead of fixed lines like in FIG. 3). The interconnected switches form horizontal and vertical buses. A switch is associated with a cell (one-to-one association) and has one terminal t0 connected to the output of the associated cell. Each switch is implemented by analog circuitry.

The network of switches (also referred to as the switch fabric) is configured to selectively interconnect the output cell terminals of the analog cells and selectively connect the output cell terminals of the analog cells to the output device terminals of the device. This means that an output cell terminal of a given cell may be connected to the output cell terminal(s) of one or more other cells through one or more switches. Likewise an output cell terminal of a given cell may be connected one or more output device terminals of the device through one or more switches.

The switches allow or disable the currents to flow along connection paths in the computation device 400, according to the mathematical function to be implemented by the computation device 400. These possible connection paths are represented with dotted lines in the FIG. 4. A connection path may go from one or more output cell terminal(s) to an output device terminal such that the signal at this output device terminal is a weighted sum of the currents from these one or more output cell terminal(s), the weights corresponding to the multiplication coefficients configured for the concerned one or more cells.

To control the flow of currents in the computation device 400, each switch has four terminals that may or not be interconnected. Each switch is programmable and configured to receive a control signal for selecting and/or activating a switch terminal interconnection configuration of the fourth terminals of the switch.

In the computation device 400, the switch terminal interconnection configuration of each switch thus depends on the mathematical function to be implemented by the computation device 400, while the connections between the cells and the switches, between the cells and the input device terminals, between the switches and the output device terminals are fixed and independent of the mathematical function to be implemented.

Figure 5A:
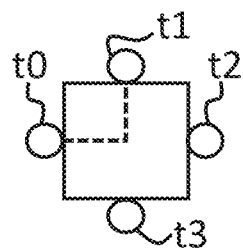
FIGS. 5A-5N show switch terminal interconnection configurations of a switch in a computation device according to examples.
Figure 5B:
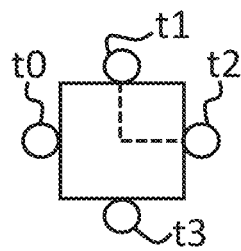
Figure 5C:
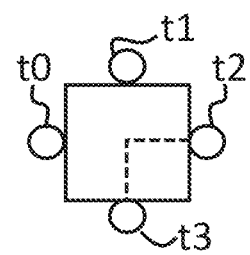
Figure 5D:
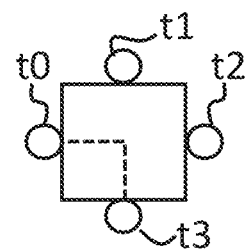
Figure 5E:
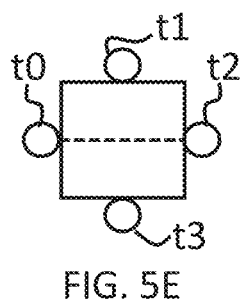
Figure 5F:
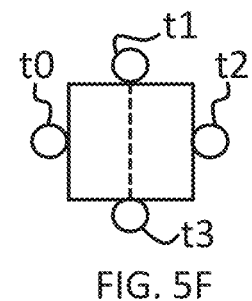
Figure 5G:
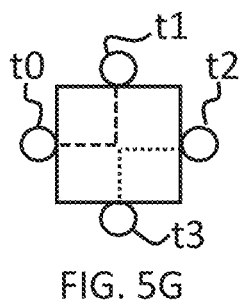
Figure 5H:
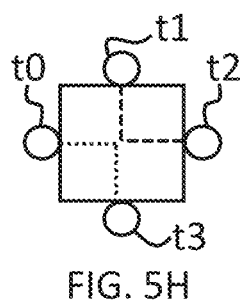
Figure 5I:
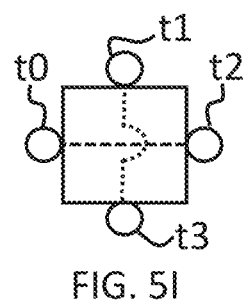
Figure 5J:
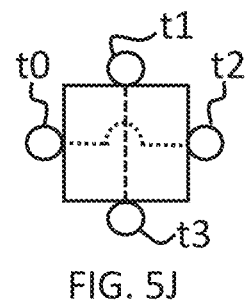
Figure 5K:
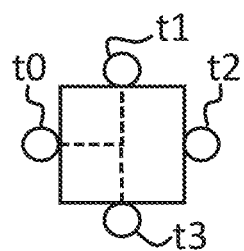
Figure 5L:
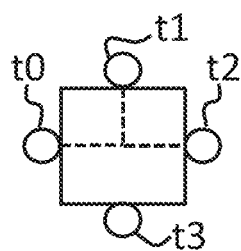
Figure 5M:
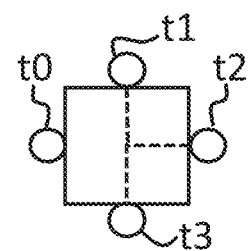
Figure 5N:
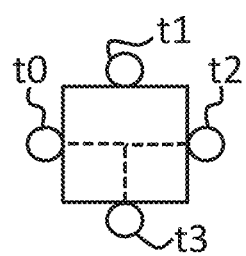

FIGS. 5A-5N show possible switch terminal interconnection configurations that may be used to implement various mathematical functions.

According to first switch terminal interconnection configurations, two first terminals of the four terminals are connected to each other and the two remaining terminals are connected to each other but not connected to the two first terminals. FIGS. 5G-5I show such switch terminal interconnection configurations. For example, in FIG. 5J, terminals t1 and t3 are interconnected, the terminals t0 and t2 are also interconnected but none of the terminals t0 and t2 is connected to terminal t1 or t3.

According to second switch terminal interconnection configurations, two first terminals of the four terminals are connected to each other and none of the two remaining terminals are not connected to another terminal. FIGS. 5A-5F show such switch terminal interconnection configurations. For example, in FIG. 5A, terminals t0 and t1 are interconnected while the terminals t2 and t3 are not interconnected to another terminal of the same switch.

According to third switch terminal interconnection configurations, three of the four terminals are connected to each other and the last remaining terminal is not connected to the other terminals. FIGS. 5K-5N show such switch terminal interconnection configurations. For example, in FIG. 5K, terminals t0, t3 and t1 are interconnected while the terminal t2 is not connected to the other terminals t0, t3 and t1.

According to a fourth switch terminal interconnection configuration, all the four terminals are connected to each other.

According to a fifth switch terminal interconnection configuration, none of the terminals is connected to another terminal.

Figure 6:
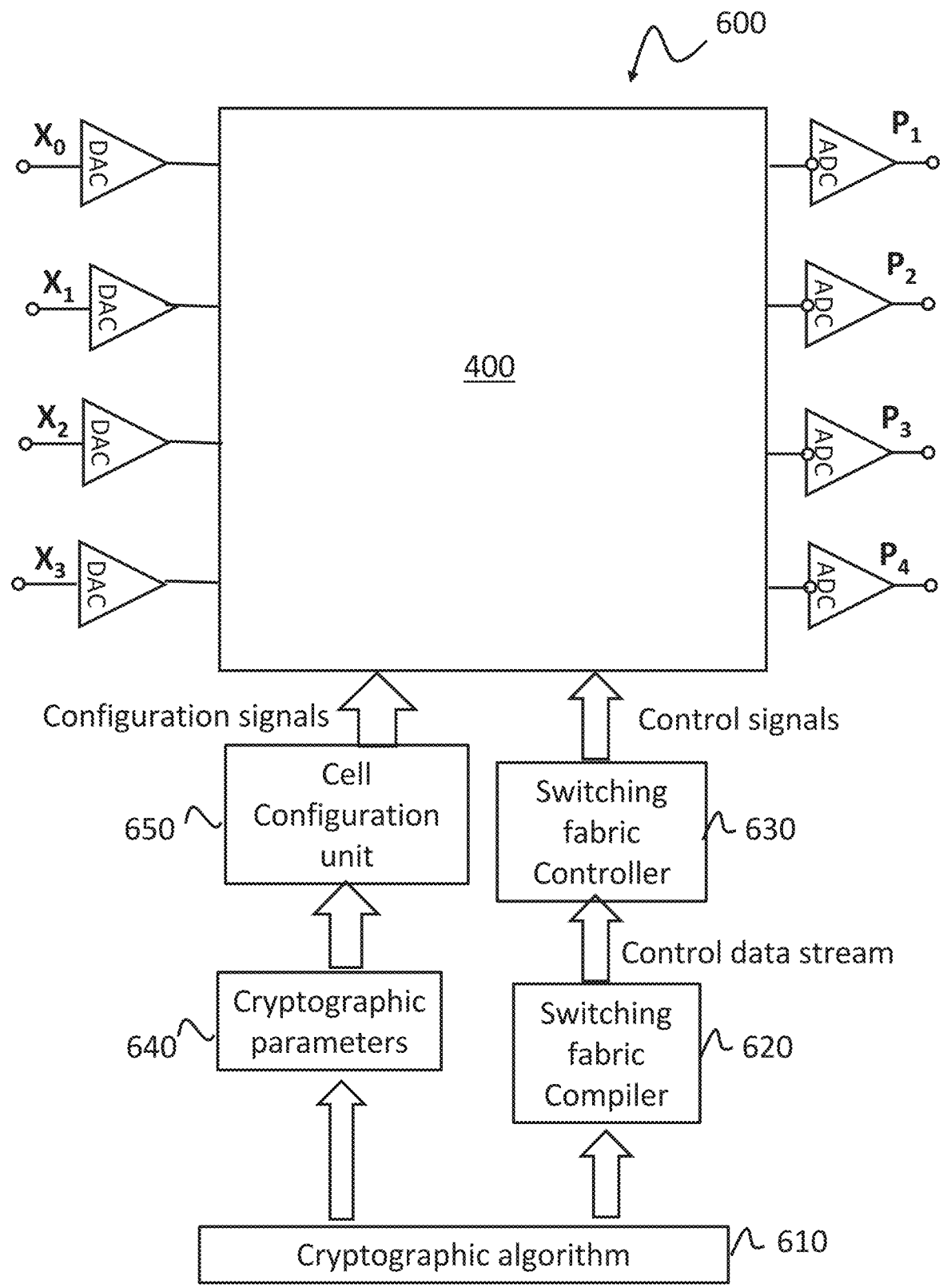
FIG. 6 shows an apparatus including a switch fabric controller and a computation device according to an example.

FIG. 6 shows an apparatus 600 including a switch fabric controller 630 and a computation device 400 according to an example.

As illustrated by the apparatus 600 of FIG. 6, the computation device 400 described by reference to FIG. 4 is a switching fabric that may be controlled by a switching fabric controller 630 configured to generate, for each switch, a control signal to select a switch terminal interconnection configuration. Each of the switch terminal interconnection configurations may be fixed or be dynamically adjusted by the control signals.

One or more parameters 640 (e.g. cryptographic parameters) of the mathematical function to be implemented by the computation device 400 may be converted by a configuration unit 650 to configuration signals to configure the multiplication coefficient for each cell of the device. Each of the multiplication coefficients may be fixed or be dynamically adjusted by the configuration signals.

A switch fabric compiler 620 may be used and configured to translate a cryptographic algorithm 610 to be implemented to a control data stream including for each concerned switch a control value identifying a switch terminal interconnection configuration.

The control values may be ordered in a predefined order corresponding to the locations of the switches in the computation device 400 (e.g. row by row from top to bottom and in each row, from left to right): thus the control data stream is an ordered sequence of control values defining the connection paths in the computation device. Alternatively an identifier of the concerned switch may be added in the sequence after or before each control value.

This control data stream is then fed to the switching fabric controller 630 that generates and sends to each switch a control signal for selecting and activating (i.e. applying) the requested switch terminal interconnection configuration.

The computation device 400 of FIG. 4 is only an example of device for illustrative purposes. A computation device may include any number of rows, and any number of cells per row. Also the rows need not to have the same number of cells. Further, in a given computation device, only some cells may be used while the other cells are not used as will be illustrated by the example of FIG. 8.

Figure 7:
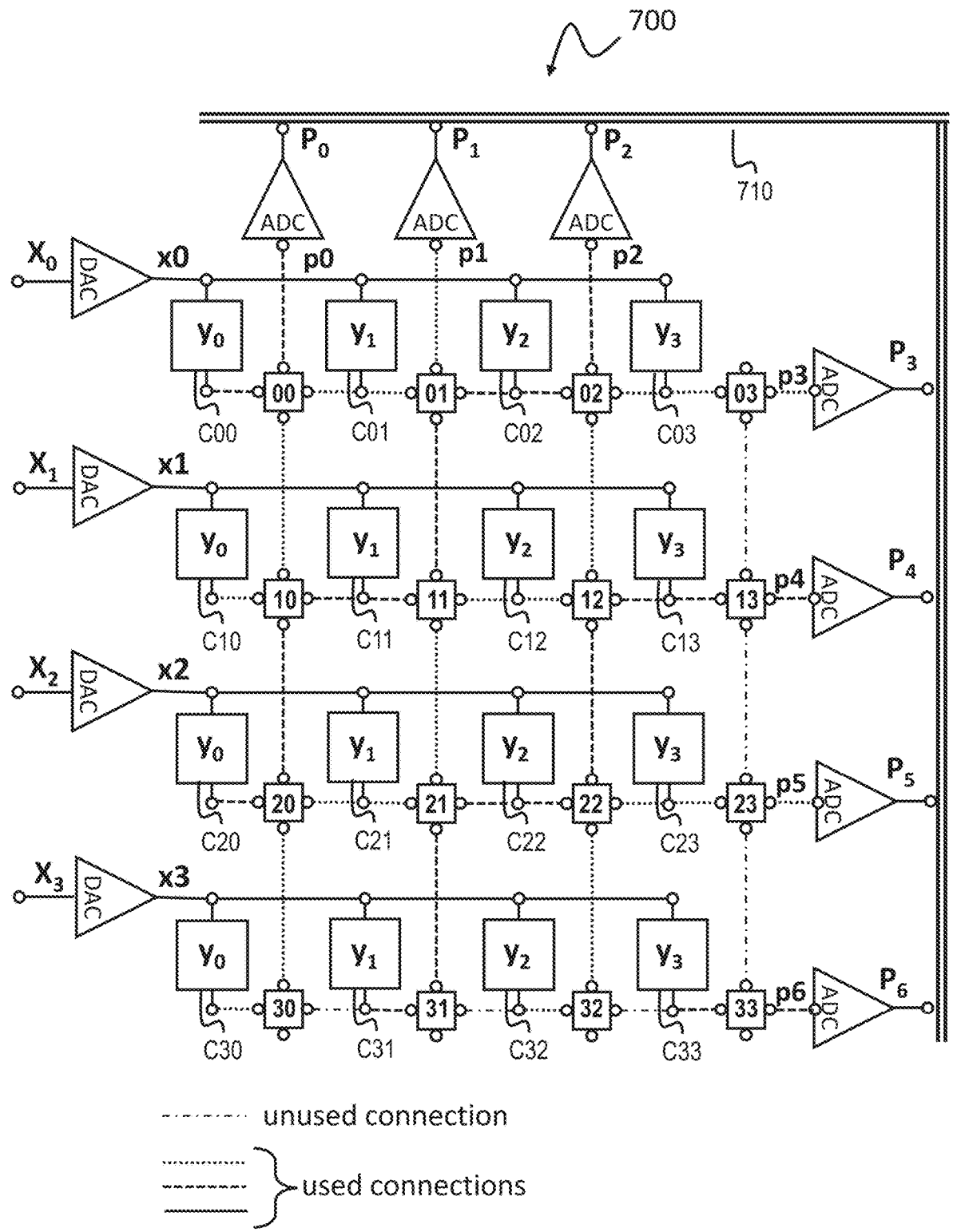
FIG. 7 shows a computation device according to an example.

FIG. 7 shows a computation device 700 in which specific switch terminal interconnection configurations are used to implement the same mathematical function (multiplication of 32-bits operands based on partial products P0 to P7) as the one implemented by the device of FIG. 2 but here with a network of switches.

The multiplication coefficient of cells C00, C10, C20 and C30 is $y_0$. The multiplication coefficient of cells C01, C11, C21 and C31 is $y_1$. The multiplication coefficient of cells C02, C12, C22 and C32 is $y_2$. The multiplication coefficient of cells C03, C13, C23 and C33 is $y_3$.

In this computation device 700:
Switches 00, 01, 02, 10, 11, 12, 20, 21, 22 use the switch terminal interconnection configuration of FIG. 5G in which terminals t1 and t0 are interconnected, the terminals t3 and t2 are also interconnected but none of the terminals t0 and t1 is connected to one of terminals t2 and t3;
Switches 03, 13, 23, 33 use the switch terminal interconnection configuration of FIG. 5E terminals t0 and t2 are interconnected while the terminals t1 and t3 are not interconnected to another terminal of this switch;
Switches 30, 31, 32 use the switch terminal interconnection configuration of FIG. 5A in which terminals t0 and t1 are interconnected while the terminals t2 and t3 are not interconnected to another terminal of the same switch.

For each switch, a limited number (e.g. 3 or 4) of distinct switch terminal interconnection configurations (or distinct interconnection directions) may be selectable (not all the possible distinct switch terminal interconnection configurations show in FIG. 5 are available). For example a switch can be controlled by a 2-bit value to select a switch terminal interconnection configuration among a set of 3 or 4 pre-defined selectable switch terminal interconnection configurations. Considering a total of 16 switches required for this device 100, a 32-bit control data stream is in this example sufficient to control the device's operation.

As represented by FIG. 7, due to the switch terminal interconnection configurations, only some connections are used (a current flows only in the used connections) and the other ones that are no used are drawn with mixed dotted lines. For example the connection between switch 03 and 13 (i.e. the connection between the terminal t3 of switch 03 and the terminal t1 of switch 13) is not used (no current flows through this connection) since the terminal t3 of switch 03 is not interconnected to another terminal of switch 03 and the terminal t1 of switch 13 is not interconnected to another terminal of switch 13. The same applies for the connection between switches 23 and 13 or between switches 23 and 33.

According to another example, only two terminals of switch 30 are interconnected to connect the output of cell 30 to switch 20 and the other terminals are not interconnected, the connection between switch 30 and switch 31 is not used, while the output of cell C31 is connected to switch 31.

In FIG. 7, the switch terminal interconnection configurations of the switches are such that:
the output of cell C00 is connected to device output P0 through switch 00 to obtain a partial product $P0=X0y0$;
the output of cells C10, C01 are connected to device output P1 through switches 10, 00 and 01 to obtain a partial product $P1=X1y0+X0y1$;
the output of cells C20, C11, C02 are connected to device output P2 through switches 20, 10, 11, 01, 02 such that $P2=X2y0+X1y1+X0y2$;
the output of cells C30, C21, C12, C03 are connected to device output P3 through switches 30, 20, 21, 11, 12, 02, 03 to obtain a partial product $P3=X3y0+X2y1+X1y2+X0y3$;
the output of cells C31, C22, C13 are connected to device output P4 through switches 31, 21, 22, 12, 13 to obtain a partial product $P4=X3y1+X2y2+X1y3$;
the output of cells C32 and C23 are connected to device output P5 through switches 32, 22, 23 to obtain a partial product $P5=X3y2+X2y3$;
the output of cells C33 is connected to device output P6 through switch 33 to obtain a partial product $P6=X3y3$.

In computation device 700, the output signals P0, P1, P2, P3, P4, P5, P6 corresponding to the partial products are added by a fast adder 710 (for example a Carry-Save Adder) to perform the required final addition of the partial products and produce the final multiplication result.

Figure 8:
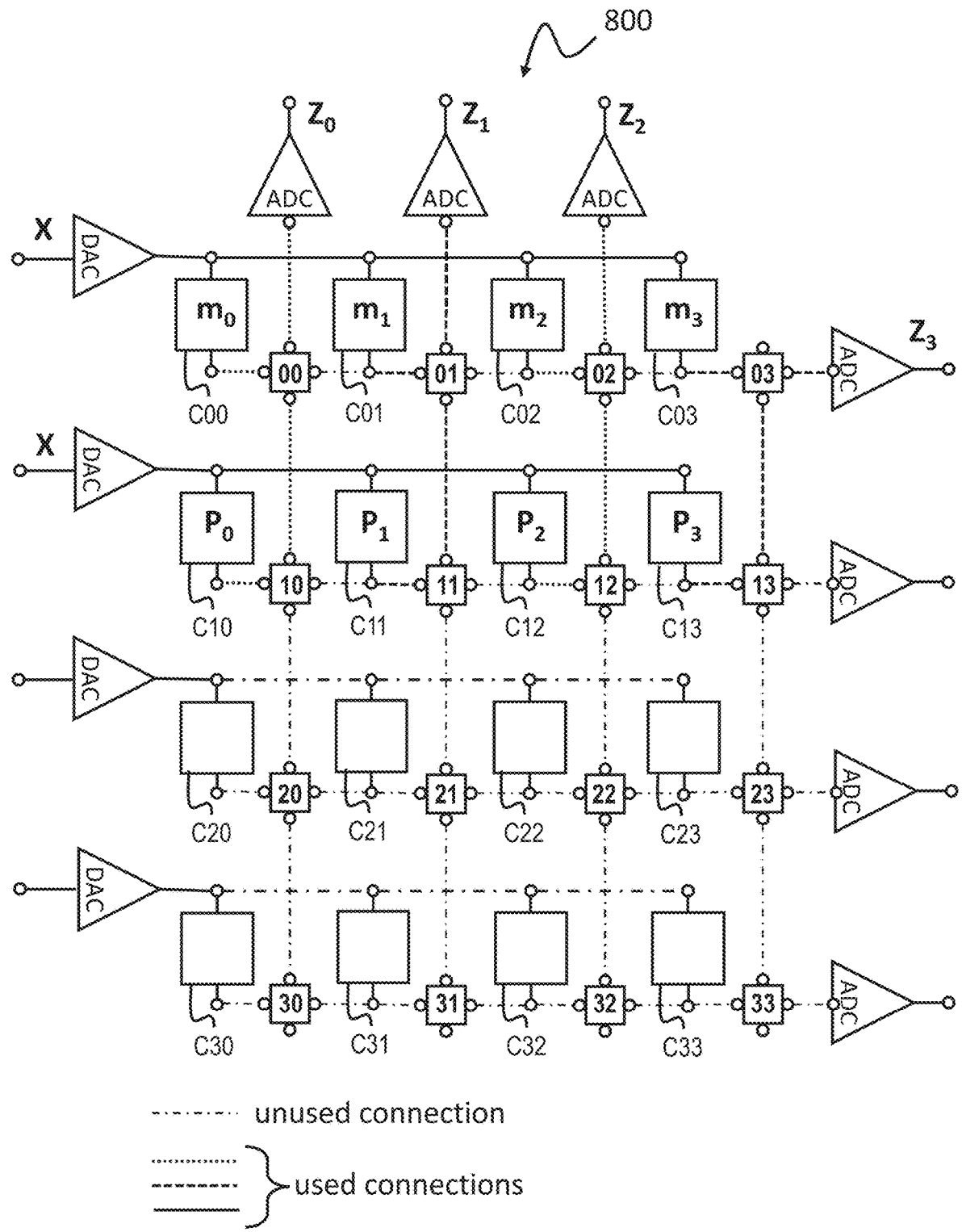
FIG. 8 shows a computation device according to an example.

FIG. 8 shows a computation device 800 in which specific switch terminal interconnection configurations are used to implement 32-bits additions, here Z=m+P.

The multiplication coefficient of cell C00 (respectively C01, C02 and C03) is $m_0$ (respectively $m_1$, $m_2$ and $m_3$). The multiplication coefficient of cell C10 (respectively C11, C12 and C13) is $P_0$ (respectively $P_1$, $P_2$ and $P_3$).

In this computation device 800:
Switches 00, 01, 02 use the switch terminal interconnection configuration of FIG. 5K in which terminals t1, t3 and t0 are interconnected;
Switches 10, 11, 12, 13 use the switch terminal interconnection configuration of FIG. 5A in which terminals t0 and t1 are interconnected while the terminals t2 and t3 are not interconnected to another terminal of this switch;
Switch 03 uses the switch terminal interconnection configuration of FIG. 5N in which in which terminals t2, t3 and t0 are interconnected.

In this example, switches 20 to 23 and 30 to 33 of the third and fourth rows are not used and no current flow from or to one of these switches. The same applies for the associated cells C20 to C23 and C30 to C33.

In FIG. 8, the switch terminal interconnection configurations of the switches are such that:
the output of cell C00 is connected to device output Z0 through switch 00 and the output of cell C10 is connected to device output Z0 through switch 10 to obtain the sum $Z0=m_0+P_0$;
the output of cell C01 is connected to device output Z1 through switch 01 and the output of cell C11 is connected to device output Z1 through switch 11 to obtain the sum $Z1=m_1+P_1$;
the output of cell C02 is connected to device output Z2 through switch 02 and the output of cell C12 is connected to device output Z2 through switch 12 to obtain the sum $Z2=m_2+P_2$;

the output of cell C03 is connected to device output Z3 through switch 03 and the output of cell C13 is connected to device output Z3 through switch 13 to obtain the sum $Z3=m_3+P_3$.

Figure 9:
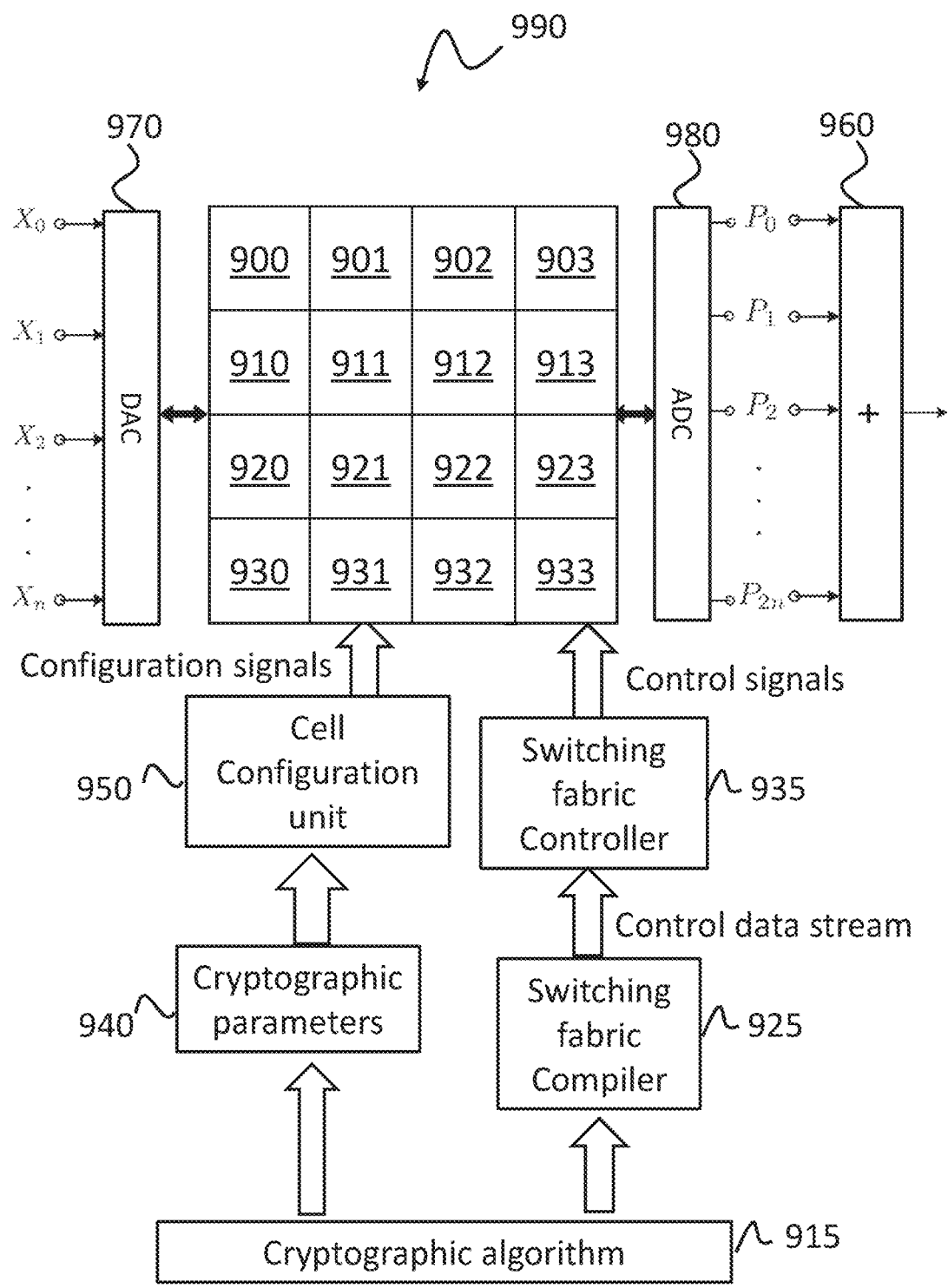
FIG. 9 shows an apparatus including a switch fabric controller and a computation device according to an example.

FIG. 9 shows an apparatus 990 including a switch fabric controller and a computation device according to an example.

Each computation device may be used as a tile and several tiles may be connected in an array fashion, as depicted by FIG. 9.

Each rectangle 900-903, 910-913, 920-923, 930-933 of the 4 by 4 grid of FIG. 9 corresponds to a computation device, for example computation device 400, 700, 800, or to another computation device. For simplicity, only 16 tiles are shown, that is 128-bit operands, although obviously as many tiles as required depending on the inputs may be connected.

This architecture allows to scale-up the number of tiles, hence, support multiplication of arbitrarily large operands. The core 256 MAC operations for the generation of the partial products are computed in parallel in each tile while the switching fabric controls which switch terminal interconnection configuration(s) have to be used and when an intermediate addition result can be propagated to the next tile. The computation device 990 itself may include input/outputs ADCs 980 and/or DACs 970 and/or adder(s) 960 to support interconnection with input/output digital systems.

Like in FIG. 6, a switching fabric controller 935 is configured to generate, for each switch, a control signal to select a switch terminal interconnection configuration. Each of the switch terminal interconnection configurations may be fixed or be dynamically adjusted by the control signals.

A switch fabric compiler 625 may be used and configured to translate a cryptographic algorithm 615 to be implemented to a control data stream including for each concerned switch: an identifier of the concerned switch and a control value identifying a switch terminal interconnection configuration. This control data stream is then fed to the switching fabric controller 635 that generates and sends to each switch a control signal for selecting and applying the requested switch terminal interconnection configuration.

Also, like in FIG. 6, the parameters 940 (e.g. cryptographic parameters) of the mathematical function to be implemented by the computation device 990 may be converted by a configuration unit 950 to configuration signals to configure a multiplication coefficient for each cell of the device. Each of the multiplication coefficients may be fixed or be dynamically adjusted by the configuration signals.

In this embodiment, the switching fabric controller 935 may be configured to generate additional control signals when results at the outputs of a tile 900-903, 910-913, 920-923, 930-933 have to be propagated to one or more next tiles.

To illustrate the propagation process, an example with an encryption algorithm 915 for Lattice-Based cryptography (32-bits for simplicity) is described. Assuming Bob holds a public key h the encrypted message Z is computed according to:

$$Z = r*h + m[\mathrm{mod}\ q]$$

The switching fabric compiler 935 translate the multiplication r*h to a control data stream and the switching fabric controller 935 generates control signals that configures a first tile (e.g. tile 900) corresponding to the computation device 700 disclosed by reference FIG. 7. At the output of the computation device 700 the partial products P0 to P7 are obtained. The partial products of r*h may then be added using an output adder 710.

Another tile like the computation device 800 of FIG. 8 may be alternatively used to compute the sum r*h+m: by storing in memory the partial products values P0 to P7 (or at least P0 to P3) as the multiplication coefficient of the cells C00 to C03 and C10 to C13 respectively in the computation device 800 and by setting the input voltage of the computation device 800 to X0=X1=1. The output of the computation device allows to add them column-wise in the top two rows as described by reference to FIG. 8. In this particular case, the output adder is not required and can be by passed (e.g. with a use of a multiplexer—not shown for simplicity). In this embodiment, the switching fabric controller 935 may be configured to generate additional control signals when the results (here partial products) at the outputs of the first tile (the computation device 400) are to be propagated to the next tile (the computation device 800).

The reduction of the result (r*h+m) with the modulo function [mod q] can be done in a separate module (not depicted). In fact, modulo operations can also be performed via simple additions and multiplications (e.g., via the Montgomery modulo reduction algorithm), so in principle an analog tile can be used to calculate modulo operations as well.

To configure all the tiles the control data stream may include a tile identifier followed by a sequence of control values defining the connection paths in the tile. The control data stream may have a format like "Tile1|Path2|Tile2|Path2 . . . " that would result in the control data stream such as "0000|00011011-0001|00011011 - . . . ", etc.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

ADC—Analog-to-Digital converter
DAC—Digital-to-Analog converter
HSM—Hardware Secret Module
MAC—Multiply Accumulate
TPM—Trusted Platform Module
SoC—System on Chip

The invention claimed is:

1. A computation device comprising:
one or more input device terminals caused to receive respective analog input signals of the device;
one or more output device terminals caused to receive respective analog output signals of the device;
one or more rows of analog cells, wherein an analog cell comprises an input cell terminal and an output cell terminal, wherein the analog cell is caused to generate, at the output cell terminal, an output analog signal whose amplitude is a product of a multiplication coefficient by an amplitude of the analog input signal received at the input cell terminal, wherein input cell terminals in a row are connected to a same input device terminal; and
a network of switches caused to selectively interconnect output cell terminals of the analog cells and selectively connect the output cell terminal of each of the analog cells to an output device terminal.

2. The computation device of claim 1, wherein each switch in the network of switches comprises four terminals.

3. The computation device of claim 1, wherein for each switch in the network, a first terminal of the switch is connected to the output cell terminal of an analog cell associated with the switch.

4. The computation device of claim 1, wherein for at least one switch, a second terminal of the switch is connected to the first terminal of another switch or to an output device terminal.

5. The computation device of claim 1, wherein for at least one switch, a third terminal of the switch is connected to the fourth terminal of another switch or to an output device terminal.

6. The computation device of claim 1, wherein at least one switch is caused to receive a control signal caused to activate a switch terminal interconnection configuration of the fourth terminals of the switch.

7. The computation device of claim 6, wherein according to at least one first switch terminal interconnection configuration, two first terminals of the four terminals are connected to each other and two remaining terminals are connected to each other but not connected to the two first terminals.

8. The computation device of claim 6, wherein according to at least one second switch terminal interconnection configuration, the two first terminals of the four terminals are connected to each other and none of the two remaining terminals are not connected to another terminal.

9. The computation device of claim 6, wherein according to at least one third switch terminal interconnection configuration, three of the four terminals are connected to each other and a last remaining terminal is not connected to the other terminals.

10. The computation device of claim 1, wherein at least one cell is configured to receive a configuration signal for configuring the multiplication coefficient.

11. The computation device of claim 1, further comprising:
one or more digital to analog converters connected respectively to the one or more input device terminals and caused to generate the respective analog input signals respectively from respective digital input signals;
the one or more analog to digital converters connected respectively to the one or more output device terminals and caused to generate respective digital output signals from the respective analog output signals of the device.

12. The computation device of claim 1, wherein the multiplication coefficient corresponds to a conductance value or resistance.

13. The computation device of claim 1, further comprising:
   a switch fabric controller caused to generate controls signals for configuring one or more switches of the network of switches with a respective switch terminal interconnection configuration.

14. The computation device of claim 13, wherein the switch fabric compiler is caused to convert a mathematical function into control values identifying for the one or more switches of the network of switches the respective switch terminal interconnection configuration;
   wherein the switch fabric controller is configured to generate the controls signals based on the control values.

15. The computation device of claim 1, further comprising:
   at least one processor; and
   at least one memory storing instructions that, when executed by the at least one processor, cause the computation device at least to perform the steps of claim 1.

16. A method in a computing device comprising:
   receiving analog input signals at one or more input device terminals of the computing device;
   receiving analog output signals one or more output device terminals of the computing device;
   generating by an analog cell of one or more rows of analog cells of the computing device, wherein the analog cell comprises an input cell terminal and an output cell terminal, an output analog signal whose amplitude is a product of a multiplication coefficient by an amplitude of the analog input signal received at the input cell terminal;
   wherein input cell terminals in a row are connected to a same input device terminal; and
   selectively interconnecting output cell terminals of the analog cells and selectively connecting the output cell terminal of each of the analog cells to an output device terminal.

17. A non-transitory computer readable medium comprising program that, when executed by an apparatus, cause the apparatus to perform at least the following:
   receiving analog input signals at one or more input device terminals of the computing device;
   receiving analog output signals one or more output device terminals of the computing device;
   generating by an analog cell of one or more rows of analog cells of the computing device, wherein the analog cell comprises an input cell terminal and an output cell terminal, an output analog signal whose amplitude is a product of a multiplication coefficient by an amplitude of the analog input signal received at the input cell terminal;
   wherein input cell terminals in a row are connected to a same input device terminal; and
   selectively interconnecting output cell terminals of the analog cells and selectively connecting the output cell terminal of each of the analog cells to an output device terminal.

* * * * *